United States Patent
Fukushi

(10) Patent No.: US 10,360,658 B2
(45) Date of Patent: Jul. 23, 2019

(54) DISPLAY CONTROL APPARATUS AND COMPUTER-READABLE RECORDING MEDIUM

(71) Applicant: RICOH COMPANY, Ltd., Ohta-Ku (JP)

(72) Inventor: Seiichiro Fukushi, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 81 days.

(21) Appl. No.: 14/903,078

(22) PCT Filed: Jun. 25, 2014

(86) PCT No.: PCT/JP2014/067598
§ 371 (c)(1),
(2) Date: Jan. 6, 2016

(87) PCT Pub. No.: WO2015/005184
PCT Pub. Date: Jan. 15, 2015

(65) Prior Publication Data
US 2016/0132991 A1    May 12, 2016

(30) Foreign Application Priority Data
Jul. 8, 2013   (JP) ................................ 2013-143056

(51) Int. Cl.
*G06F 3/0481*   (2013.01)
*G06F 3/0485*   (2013.01)
(Continued)

(52) U.S. Cl.
CPC ............ *G06T 3/40* (2013.01); *A63F 13/5255* (2014.09); *G06F 3/0485* (2013.01);
(Continued)

(58) Field of Classification Search
CPC combination set(s) only.
See application file for complete search history.

(56) References Cited

U.S. PATENT DOCUMENTS 5,694,533 A * 12/1997 Richards ................. G06T 15/10
345/420
6,977,676 B1    12/2005 Sato et al.
(Continued)

FOREIGN PATENT DOCUMENTS

JP    2005-234663 A    9/2005
JP    2007-043225      2/2007
(Continued)

OTHER PUBLICATIONS

Rui et al., Viewing meeting captured by an omni-directional camera, Proceeding of the SIGCHI conference on Human factors in computing systems, ACM 2001, pp. 450-457.*

(Continued)

*Primary Examiner* — Motilewa Good Johnson
(74) *Attorney, Agent, or Firm* — Xsensus LLP

(57) ABSTRACT

A display control apparatus including: a creating unit that creates, from an image, a partial image of the image, and including in a center thereof an arbitrary viewpoint on the image; a display controller that displays, on a display, a display image including the image and a viewpoint listing image of a list of thumbnails of plural of the partial images; and an accepting unit that accepts input indicating a change of the image in the display image, according to operation on the image or the viewpoint listing image. The display controller changes the image in the display image according to the input, and changes a sequential order of the thumbnails in the viewpoint listing image such that a thumbnail of the partial image corresponding to a region of the image to be newly displayed according to the input is displayed at a predetermined position in the viewpoint listing image.

18 Claims, 10 Drawing Sheets

(51) Int. Cl.
*H04N 5/262* (2006.01)
*G06T 3/40* (2006.01)
*A63F 13/5255* (2014.01)

(52) U.S. Cl.
CPC ....... *G06F 3/04815* (2013.01); *H04N 5/2621* (2013.01); *H04N 5/2628* (2013.01)

(56) References Cited

U.S. PATENT DOCUMENTS

| | | | | |
|---|---|---|---|---|
| 7,158,151 | B2* | 1/2007 | Asami | G01C 21/367 345/419 |
| 7,483,590 | B2* | 1/2009 | Nielsen | G06T 3/0062 345/419 |
| 7,823,058 | B2* | 10/2010 | Pea | H04N 5/262 345/620 |
| 8,102,395 | B2* | 1/2012 | Kondo | G03B 21/56 345/427 |
| 8,515,159 | B2* | 8/2013 | Snavely | G06K 9/00637 382/154 |
| 8,645,832 | B2* | 2/2014 | Pea | G11B 27/105 715/719 |
| 8,744,214 | B2* | 6/2014 | Snavely | G06F 17/30274 345/419 |
| 8,786,596 | B2* | 7/2014 | House | G06T 15/20 345/419 |
| 8,791,984 | B2* | 7/2014 | Jones | G08B 13/19641 348/36 |
| 9,070,402 | B2* | 6/2015 | Burtnyk | G11B 27/034 |
| 9,153,073 | B2* | 10/2015 | Langlotz | G06T 19/006 |
| 9,164,653 | B2* | 10/2015 | Keondjian | G06F 17/30058 |
| 9,282,321 | B2* | 3/2016 | Sandrew | G06T 15/205 |
| 9,363,463 | B2* | 6/2016 | Taneichi | H04N 5/765 |
| 9,648,304 | B2* | 5/2017 | Ohtomo | H04N 13/0275 |
| 9,692,965 | B2* | 6/2017 | Hayashi | G06T 11/60 |
| 9,864,481 | B2* | 1/2018 | Misawa | G06F 3/04815 |
| 2003/0197785 | A1 | 10/2003 | White et al. | |
| 2004/0141014 | A1* | 7/2004 | Kamiwada | G06F 3/04815 715/848 |
| 2004/0268451 | A1* | 12/2004 | Robbin | G06F 17/30058 715/738 |
| 2005/0030643 | A1* | 2/2005 | Gal | G02B 13/06 359/725 |
| 2005/0099500 | A1* | 5/2005 | Fujita | H04N 5/23206 348/207.99 |
| 2007/0110338 | A1* | 5/2007 | Snavely | G06F 17/30274 382/305 |
| 2007/0211149 | A1 | 9/2007 | Burtnyk et al. | |
| 2009/0019369 | A1* | 1/2009 | Borovsky | G06F 3/0482 715/736 |
| 2009/0083626 | A1 | 3/2009 | Fitzmaurice et al. | |
| 2009/0164567 | A1* | 6/2009 | Hara | G06F 3/0482 709/203 |
| 2009/0204929 | A1* | 8/2009 | Baurmann | H04N 5/44543 715/836 |
| 2009/0207246 | A1 | 8/2009 | Inami et al. | |
| 2010/0111501 | A1* | 5/2010 | Kashima | G06T 11/60 386/212 |
| 2010/0122208 | A1* | 5/2010 | Herr | G06F 3/04845 715/799 |
| 2010/0125405 | A1 | 5/2010 | Chae et al. | |
| 2011/0050848 | A1* | 3/2011 | Rohaly | G06T 15/10 348/43 |
| 2011/0066627 | A1* | 3/2011 | Seung | G06F 3/04883 707/758 |
| 2012/0057002 | A1 | 3/2012 | Grafulla-Gonzalez et al. | |
| 2012/0200665 | A1 | 8/2012 | Furumura et al. | |
| 2012/0287165 | A1* | 11/2012 | Yamada | G06F 3/0483 345/672 |
| 2012/0329527 | A1* | 12/2012 | Kang | H04N 13/349 13/349 |
| 2013/0044108 | A1* | 2/2013 | Tanaka | G06T 15/04 345/419 |
| 2013/0054319 | A1* | 2/2013 | Woods | G06F 3/04815 705/14.4 |
| 2013/0071012 | A1* | 3/2013 | Leichsenring | G06K 9/80 382/154 |
| 2013/0178257 | A1* | 7/2013 | Langseth | G06T 17/05 463/4 |
| 2013/0326419 | A1 | 12/2013 | Harada et al. | |
| 2014/0152852 | A1* | 6/2014 | Ito | H04N 1/00137 348/207.1 |
| 2014/0267589 | A1* | 9/2014 | Matsubara | H04N 5/23238 348/36 |
| 2014/0351763 | A1* | 11/2014 | Lee | G03B 37/00 715/838 |
| 2015/0130893 | A1* | 5/2015 | Kimura | G03B 37/00 348/36 |
| 2015/0145886 | A1* | 5/2015 | Kawai | G06F 3/0483 345/619 |
| 2015/0153933 | A1* | 6/2015 | Filip | G06F 17/30265 715/838 |
| 2015/0373296 | A1* | 12/2015 | Ushiyama | H04N 5/765 725/91 |
| 2016/0073022 | A1* | 3/2016 | Kimura | G06T 3/0012 348/36 |

FOREIGN PATENT DOCUMENTS

| | | |
|---|---|---|
| JP | 2010-148028 | 7/2010 |
| JP | 2011-076249 | 4/2011 |
| JP | 2011-211398 | 10/2011 |
| JP | 2014-006880 | 1/2014 |
| KR | 10-2012-0098829 A | 9/2012 |
| RU | 2011 114 935 A | 10/2012 |

OTHER PUBLICATIONS

Luís António da Rosa Neng, "360° HYPERVIDEO", Retrieved from the Internet: <URL:http://repositorio.ul.pt/bitstream/10451/7738/1/ulfc102521_tm_Luís_Neng.pdf, XP055183807, 2011, 66 Pages, dated unknown.

Shashindoujow Fukushiten-Fukusuu No. 360° Panorama WO Kirikaete Goran Itadakemasu, [online], Feb. 25, 2011 [retried on Sep. 8, 2014] Retried from the Internet.

International Search Report dated Sep. 16, 2014 in PCT/JP2014/067598 filed on Jun. 25, 2014.

Office Action dated May 10, 2017 in Russian Patent Application No. 2015155277/08 (with English translation).

Office Action dated May 30, 2017 in Korean Patent Application No. 10-2016-7000386 (with English translation).

Office Action issued in Japanese Patent Application No. 2013-143056 dated Mar. 28, 2017.

Office Action issued in Japanese Patent Application No. 2017-127578 dated May 29, 2018.

* cited by examiner

|   | ANGLE OF VIEW | CAMERA ANGLE | CAMERA POSITION |
|---|---|---|---|
| a | TO 60° | TO 60° | 0.0 |
| A | 60° | 60° | 0.0 |
| b | 60° TO 120° | 60° | 0.0 TO -1.0 |
| B | 120° | 60° | -1.0 |
| c | 120° TO 240° | 60° TO 120° | -1.0 |
| C | 240° | 120° | -1.0 |
| d | 240° TO 286° | 120° | -1.0 TO -1.38 |
| D | 286° | 120° | -1.38 |

| VIEWPOINT | AZIMUTH | ANGLE OF ELEVATION | ANGLE OF VIEW | THUMBNAIL |
|---|---|---|---|---|
| VIEWPOINT A | 200° | 0° | 120° | THUMBNAIL OF VIEWPOINT A |
| VIEWPOINT B | 250° | 0° | 120° | THUMBNAIL OF VIEWPOINT B |
| VIEWPOINT C | 300° | 0° | 120° | THUMBNAIL OF VIEWPOINT C |
| VIEWPOINT D | 0° | 0° | 120° | THUMBNAIL OF VIEWPOINT D |
| VIEWPOINT E | 50° | 0° | 120° | THUMBNAIL OF VIEWPOINT E |
| VIEWPOINT F | 100° | 0° | 120° | THUMBNAIL OF VIEWPOINT F |
| VIEWPOINT G | 150° | 0° | 120° | THUMBNAIL OF VIEWPOINT G |

(a)  (b)

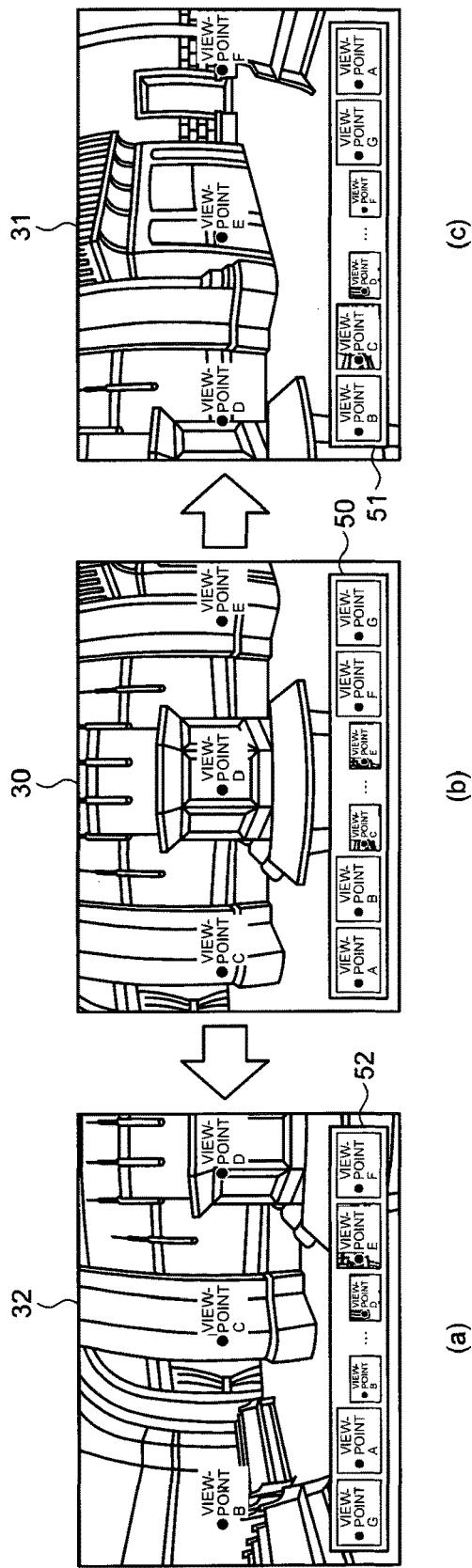

FIG.13

| VIEWPOINT | AZIMUTH | ANGLE OF ELEVATION | HORIZONTAL ANGLE OF VIEW | VERTICAL ANGLE OF VIEW | THUMBNAIL |
|---|---|---|---|---|---|
| VIEWPOINT a | 250° | 0° | 120° | 90° | THUMBNAIL OF VIEWPOINT a |
| VIEWPOINT b | 300° | 0° | 120° | 90° | THUMBNAIL OF VIEWPOINT b |
| VIEWPOINT c | 0° | 60° | 120° | 90° | THUMBNAIL OF VIEWPOINT c |
| VIEWPOINT d | 0° | 30° | 120° | 90° | THUMBNAIL OF VIEWPOINT d |
| VIEWPOINT e | 0° | 0° | 120° | 90° | THUMBNAIL OF VIEWPOINT e |
| VIEWPOINT f | 0° | -30° | 120° | 90° | THUMBNAIL OF VIEWPOINT f |
| VIEWPOINT g | 0° | -60° | 120° | 90° | THUMBNAIL OF VIEWPOINT g |
| VIEWPOINT h | 50° | 0° | 120° | 90° | THUMBNAIL OF VIEWPOINT h |
| VIEWPOINT i | 100° | 0° | 120° | 90° | THUMBNAIL OF VIEWPOINT i |

DISPLAY CONTROL APPARATUS AND COMPUTER-READABLE RECORDING MEDIUM

TECHNICAL FIELD

The present invention relates to a display control apparatus and a computer-readable recording medium.

BACKGROUND ART

A technique in which images of all directions at an imaging spot are imaged to make an omnidirectional view at the imaging spot into one piece of image has been known. For example, in Patent Literature 1, the invention of an observation device that converts images of all directions at an imaging spot into an image for display, and displays the image for display on a display unit of a cylindrical casing is disclosed. Moreover, a technique in which a part of an image in which all directions at an imaging spot are put into one piece of image is displayed on a display of a personal computer in such a form that a predetermined direction is actually viewed from an imaging spot has been known. Furthermore, a technique of changing a display range (direction) of an image arbitrarily according to the operation of a user has been known.

However, with the conventional techniques, it has been difficult for a user to grasp relation between a display range of an image that is currently displayed on a screen and information indicating a list of viewpoints on the image.

CITATION LIST

Patent Literature

[PTL 1] Patent document 1: Japanese Patent Application Laid-open No. 2010-148028

DISCLOSURE OF INVENTION

Problem to be Solved by the Invention

The present invention is achieved in view of the above problem, and an object of the present invention is to provide a display control apparatus and a computer-readable recording medium containing a program that are capable of clarifying the relation between a display range of an image displayed on a screen and information indicating a list of viewpoints on the image.

Means for Solving Problem

To achieve the object, a non-transitory computer-readable recording medium according to the present invention contains a computer program that causes a computer to function as: a creating unit that creates, from an image, a partial image that is an image of a region of a part of the image, and that includes in a center thereof an arbitrary viewpoint on the image; a display control unit that displays, on a display device, a display image that includes the image and a viewpoint listing image that is a list of thumbnails of a plurality of the partial images; and an accepting unit that accepts input indicating a change of the image in the display image, according to operation made toward any one of the image and the viewpoint listing image, wherein the display control unit changes the image in the display image according to the input indicating a change of the image, and changes a sequential order of the thumbnails in the viewpoint listing image such that a thumbnail of the partial image corresponding to a region of the image to be newly displayed according to the input indicating a change of the image is displayed at a predetermined position in the viewpoint listing image.

Also, to achieve the object, a non-transitory computer-readable recording medium according to the present invention contains a computer program that causes a computer to function as: a creating unit that creates, from an image, a partial image that is an image of a region of a part of the image, and that includes in a center thereof an arbitrary viewpoint on the image; a display control unit that displays, on a display device, a display image that includes the image, and a viewpoint listing image that is a list of thumbnails of a plurality of the partial images; and an accepting unit that accepts input indicating a change of the image in the display image, according to operation made toward any one of the image and the viewpoint listing image, wherein the display control unit changes the image in the display image according to the input indicating a change of the image, and changes a size of a thumbnail of the partial image corresponding to a region of the image to be newly displayed according to the input indicating a change of the image.

Also, to achieve the object, a display control apparatus according to the present invention comprises: a creating unit that creates, from an image, a partial image that is an image of a region of a part of the image, and that includes in a center thereof an arbitrary viewpoint on the image; a display control unit that displays, on a display device, a display image that includes the image and a viewpoint listing image that is a list of thumbnails of a plurality of the partial images; and an accepting unit that accepts input indicating a change of the image in the display image, according to operation made toward any one of the image and the viewpoint listing image, wherein the display control unit changes the image in the display image according to the input indicating a change of the image, and changes a sequential order of the thumbnails in the viewpoint listing image such that a thumbnail of the partial image corresponding to a region of the image to be newly displayed according to the input indicating a change of the image is displayed at a predetermined position in the viewpoint listing image.

Effect of the Invention

According to the present invention, such an effect is produced that relation between display range of an image displayed on a screen and information indicating a list of viewpoints on the image can be made clear.

BRIEF DESCRIPTION OF DRAWINGS

FIG. 12 is a diagram illustrating an example of changing a display image that is displayed on the display device of the second embodiment.

FIG. 13 is a table indicating an example of viewpoint listing information of a display control apparatus of a third embodiment according to the present invention.

BEST MODES FOR CARRYING OUT THE INVENTION

Embodiments of a display control apparatus and a computer-readable recording medium containing a computer program are explained in detail below with reference to the accompanying drawings.

First Embodiment

Figure 1:
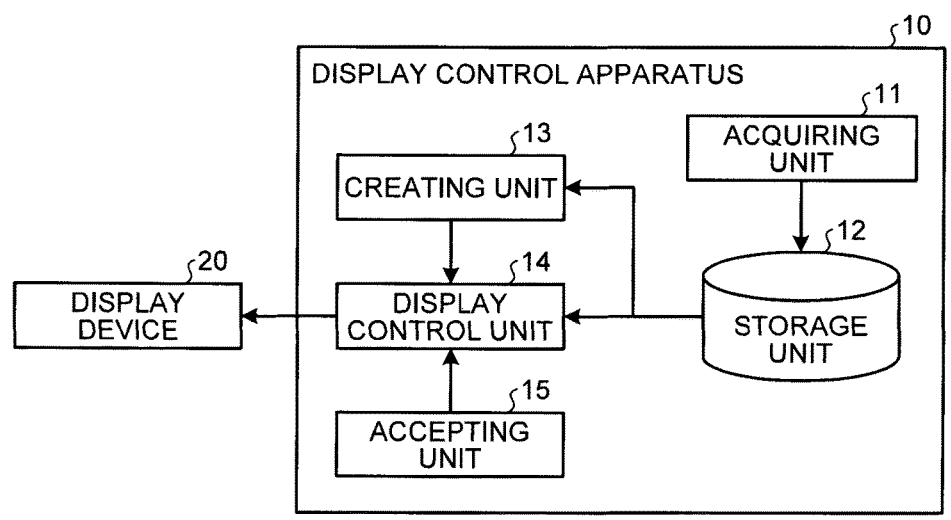
FIG. 1 is a block diagram illustrating an example of a configuration of a display control apparatus of a first embodiment according to the present invention.

FIG. 1 is a block diagram illustrating an example of a configuration of a display control apparatus 10 of a first embodiment of the present invention. The display control apparatus 10 of the present embodiment includes an acquiring unit 11, a storage unit 12, a creating unit 13, a display control unit 14, and the accepting unit 15. The display control apparatus 10 is connected to a display device 20. The display control apparatus 10 controls images (hereinafter, "display image") displayed on the display device 20.

The acquiring unit 11 acquires an omnidirectional image that is an image of all directions at an imaging spot from an external device such as an imaging device that can create the omnidirectional image. Equipment of, for example, an imaging unit that images all directions at an imaging spot using two pieces of fish-eye lenses facing opposite directions from each other and a creating unit that combines two pieces of images that are imaged by the two pieces of fish-eye lenses to make one piece of an image enables the imaging device to create an omnidirectional image. Note that by including the function of the imaging device described above in the acquiring unit 11, it is not necessary to acquire an omnidirectional image from an external device. Moreover, although in the present embodiment, an omnidirectional image is used as an example, it is not limited to an omnidirectional image, and may be an ordinary image, a panoramic image extending horizontally or vertically, and the like. Therefore, in the following embodiment, it is needless to say that an omnidirectional image can be referred simply to as an image, and a partial omnidirectional image described later can be referred simply to as a partial image.

Figure 2:
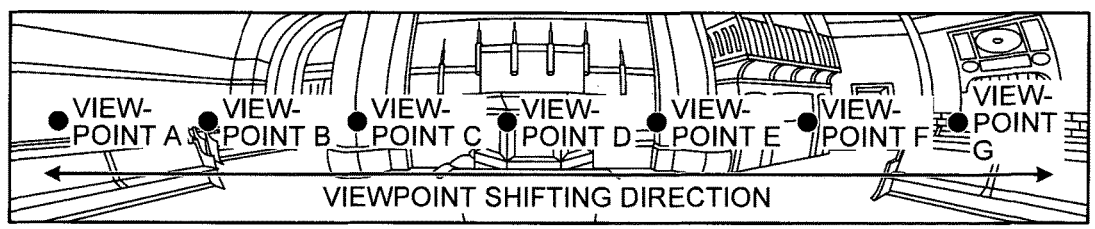
FIG. 2 is a diagram illustrating an example of an omnidirectional image of the first embodiment.

The storage unit 12 stores therein the omnidirectional image. FIG. 2 is a diagram illustrating an example of an omnidirectional image of the first embodiment. As illustrated in FIG. 2, because the omnidirectional image is an image that is obtained by imaging all directions at an imaging spot, it is an image like a panoramic image. In FIG. 2, while a horizontal part is illustrated among all directions, an upper part and a lower part are not displayed. When the upper part and the lower part are wished to be displayed, the parts can be displayed by making a user virtually move in the image. Multiple viewpoints (A to G) are present on the omnidirectional image. The viewpoint is information that indicates a region that a user, such as a person who created the omnidirectional image and a person who uses the omnidirectional image, wishes it to be focused. An image in which a region including this viewpoint is cut out (corresponding to a partial omnidirectional image described later) is to be the image indicated in viewpoint listing information which is described later. Therefore, this image indicated in the viewpoint listing information and a position on an omnidirectional image including this image are associated. FIG. 2 illustrates an example of a case in which viewpoints A to G are present on an omnidirectional image. The storage unit 12 stores information (hereinafter, "viewpoint listing information") indicating a position of a viewpoint on an omnidirectional image. Details of the omnidirectional image and the viewpoint listing information are described later.

The creating unit 13 creates, from an omnidirectional image, a partial omnidirectional image that is an image of a region of a part of the omnidirectional image. The partial omnidirectional image includes, in a center thereof, an image of an arbitrary viewpoint on an omnidirectional image. The omnidirectional image is an image that includes all directions at an imaging spot, and enables a user to view an arbitrary direction of the omnidirectional image. When wishing to confirm an image that a user wishes to view later or wishing to show the image to another user, it is displayed as a partial omnidirectional image that includes a predetermined viewpoint in a center thereof. The creating unit 13 may create the partial omnidirectional image corresponding to the predetermined viewpoint in advance. Specifically, the display control apparatus 10 may be configured to store, in the storage unit 12, a partial omnidirectional image that is frequently used, partial omnidirectional images that correspond to viewpoints that are registered in the viewpoint listing information described later, or the like.

The display control unit 14 displays, on the display device 20, a display image that is an image including an omnidirectional image and a viewpoint listing image that is a list of thumbnails of multiple partial omnidirectional images. In the display control apparatus 10, by displaying the viewpoint listing image together with an omnidirectional image on the display device 20, operability and convenience when a user chooses a viewpoint are improved. As for the omnidirectional image displayed on the display device 20, only a part of regions of the omnidirectional image is displayed in an enlarged manner or the like in some cases. In the following, when described as an omnidirectional image, it may indicate showing the entire image, or may indicate an image in which only a part of regions of the entire the image is shown. Note that even if only a part of regions of the entire image is displayed as described, an image outside the displayed region can be moved into a display region by scrolling or operating a touch panel.

Figure 3:
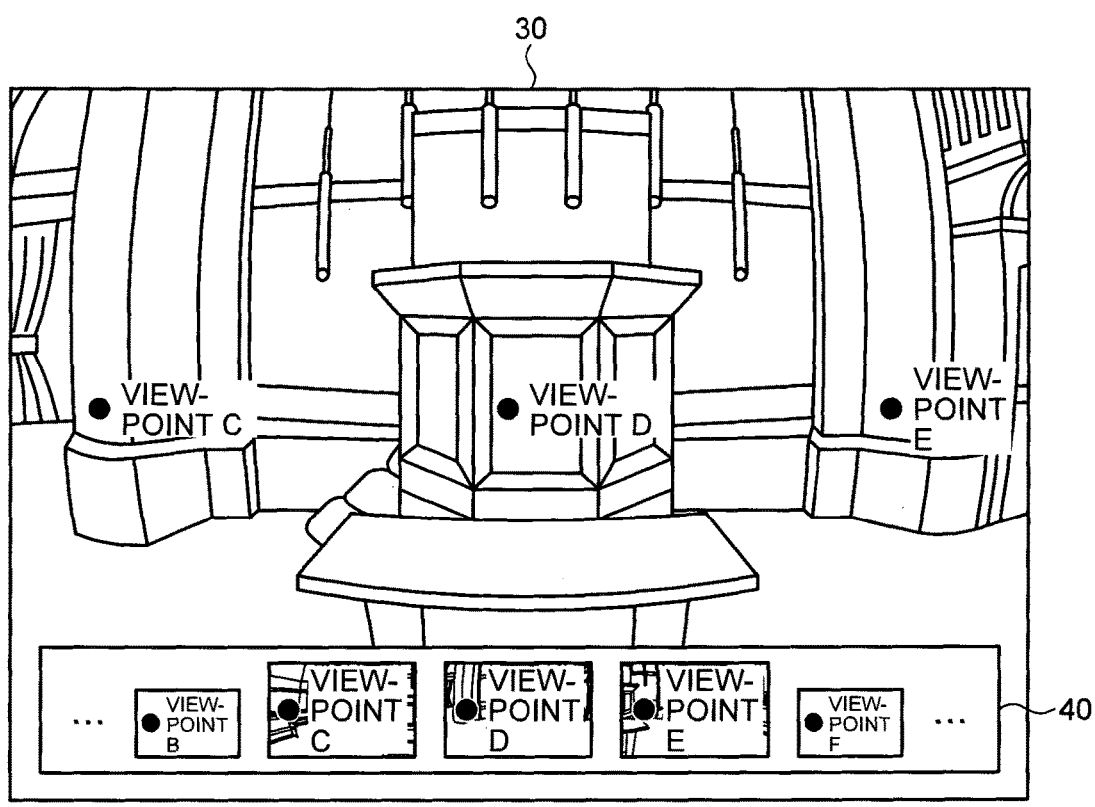
FIG. 3 is a diagram illustrating an example of a display image that is displayed on a display device of the first embodiment.

FIG. 3 is a diagram illustrating an example of a display image that is displayed on the display device 20 of the first embodiment. The display image includes an omnidirectional image 30 showing a part of an omnidirectional image and a viewpoint listing image 40. The omnidirectional image 30 illustrated in FIG. 3 is an example of a case in which a viewpoint D on the omnidirectional image shown in FIG. 2 is included in a center thereof. In other words, it is an example of a case in which the display device 20 displays the omnidirectional image 30 corresponding to the viewpoint D. The omnidirectional image can include more than one viewpoint on the omnidirectional image. For example, the omnidirectional image 30 includes, besides the viewpoint D, a viewpoint C on a left side of the image and a viewpoint E on a right side of the image.

A region of the viewpoint listing image 40 indicates an example when displayed at a lower part of a screen of the display device 20. In the region of the viewpoint listing image 40, thumbnails of the partial omnidirectional images corresponding to the viewpoints B to F are displayed. That is, five pieces of thumbnails are displayed, and display of other thumbnails are omitted as " . . . " However, the display control unit 14 may display thumbnails of the partial omnidirectional images of all of the designated viewpoints by reducing the size of the thumbnails according to the size of the region of the viewpoint listing image 40 without omitting display of the other thumbnails.

The display control unit 14 controls such that a thumbnail of a viewpoint included in the partial omnidirectional image in the center thereof is displayed at a predetermined position in the viewpoint listing image. In the example shown in FIG. 3, a region of a partial omnidirectional image corresponding to the viewpoint D is displayed in the center, and the display control unit 14 controls such that the thumbnail of this partial omnidirectional image is displayed at a predetermined position in the viewpoint listing image 40. In the display control apparatus 10 according to the present embodiment, the predetermined position is a position at the center of the viewpoint listing image, and thereby enabling to clarify the relation between the omnidirectional image displayed on the display device 20 and thumbnails of the viewpoint listing image.

Furthermore, the display control unit 14 makes the size of thumbnails of partial omnidirectional images including viewpoints that are shown in the omnidirectional image 30 of the display image larger than the size of thumbnails of partial omnidirectional images including viewpoints that are not shown in the omnidirectional image of the display image. In the example shown in FIG. 3, because viewpoints C to E are included in the omnidirectional image 30 included in the display image, the size of thumbnails of partial omnidirectional images corresponding to viewpoints C to E is enlarged. Thus, the display control apparatus 10 according to the present embodiment can clarify the relation between an omnidirectional image that is displayed on the display device 20 and the thumbnails of the partial omnidirectional images that are shown in the viewpoint listing image.

Referring back to FIG. 1, the accepting unit 15 accepts input indicating a change of the omnidirectional image of the display image, according to operation made to the omnidirectional image or the viewpoint listing image. Operation made to the omnidirectional image is, for example, operation to designate (choose) a viewpoint that is displayed on the omnidirectional image. In response to this operation, for example, the omnidirectional image 30 in FIG. 3 moves. For example, if a user designates the viewpoint C on the omnidirectional image, the omnidirectional image 30 is changed to the omnidirectional image 30 having the viewpoint C in the center. According to that, the viewpoint listing image is also changed to be aligned such that a thumbnail of a partial omnidirectional image of the viewpoint C comes in the center.

Moreover, operation made to the viewpoint listing image is operation to choose a thumbnail of a partial omnidirectional image on the viewpoint listing image, operation to change a thumbnail of a partial omnidirectional image to be displayed at the predetermined position in the viewpoint listing image by scrolling the viewpoint listing image, and the like. In response to this operation, for example, the omnidirectional image 30 in FIG. 3 is shifted. For example, if a user chooses a thumbnail of a partial omnidirectional image of the viewpoint F on the viewpoint listing image, the omnidirectional image 30 is changed to the omnidirectional image 30 having the viewpoint F in the center. Moreover, according to that, the viewpoint listing image is also changed to be aligned such that a thumbnail of a partial omnidirectional image of the viewpoint F comes in the center. In the display control apparatus 10 according to the present embodiment, the predetermined position is a position at the center of the viewpoint listing image.

Note that an input device that is used by a user for operation may be arbitrary. For example, it may be a mouse or a keyboard, or the display device 20 implemented by a touch panel that includes a display unit and an input unit, or the like.

In response to input indicating a change of the omnidirectional image, the display control unit 14 changes the omnidirectional image of the display image, and changes a sequential order of thumbnails of the viewpoint listing image such that a thumbnail of a partial omnidirectional image corresponding to a region of the omnidirectional image that is to be newly displayed according to input indicating a change of the omnidirectional image is displayed in the center of the viewpoint listing image. Note that the omnidirectional image before the change and the omnidirectional image after the change do not differ as an image, and the omnidirectional image of the display image is changed by the display control unit 14 changing a region of the omnidirectional image to be displayed. An example of a change of the display image is explained specifically with reference to FIG. 4 (a) to (c).

Figure 4:
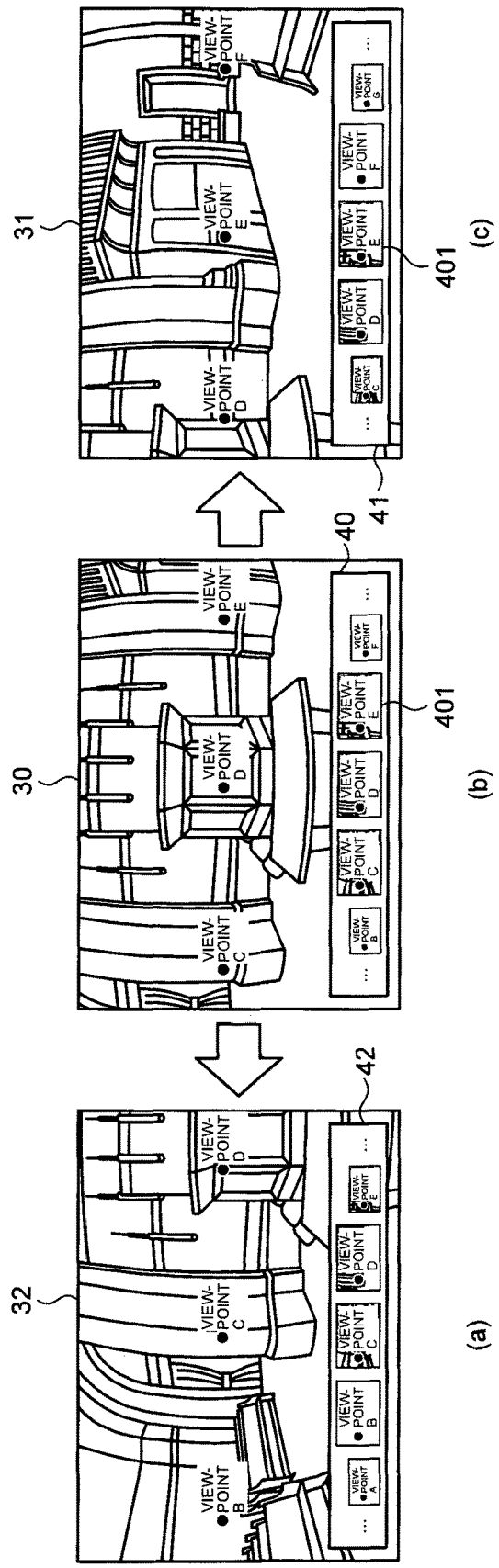
FIG. 4 is a diagram illustrating an example of changing a display image that is displayed on the display device of the first embodiment.

FIG. 4 (a) to (c) are diagrams illustrating an example of changing the display image that is displayed on the display device 20 of the first embodiment. The omnidirectional image 30 in FIG. 4 (b) is a case in which the partial omnidirectional image that is an image of the region including the viewpoint D is included in the center, and indicates the display image before the change.

FIG. 4 (c) indicates a case in which the accepting unit 15 has accepted an instruction to change to the viewpoint E from a user. Specifically, the accepting unit 15 accepts input indicating the instruction to change the display of the omnidirectional image included in the display image to the viewpoint E in response to operation by a user. The operation by the user includes operation of designating the viewpoint E on the omnidirectional image 30, operation of choosing a thumbnail 401 (thumbnail of a partial omnidirectional image that is an image of a region including the viewpoint E) of the partial omnidirectional image on the viewpoint listing image 40, operation of bringing the thumbnail 41 of the partial omnidirectional image to the center of the viewpoint listing image (operation of shifting from a state of the viewpoint listing image 40 to a state of a viewpoint listing image 41) by scrolling on the viewpoint listing image 40, or the like.

When the accepting unit 15 accepts input to change to viewpoint E from a user, the display control unit 14 displays the display image including an omnidirectional image 31 and the viewpoint listing image 41. That is, the display control unit 14 changes display of the omnidirectional image included in the display image, from the omnidirectional image 30 having the viewpoint D in the center to the omnidirectional image 31 having the viewpoint E in the center. Moreover, at the same time, the display control unit 14 changes the viewpoint listing image included in the display image from the viewpoint listing image 40 to the viewpoint listing image 41. As described, the omnidirectional image 31 is to be the omnidirectional image that includes the partial omnidirectional image of the region including the viewpoint E in the center. Furthermore, the viewpoint listing image 41 displays the thumbnails corresponding to the viewpoints included in the omnidirectional image 31 in the center of the viewpoint listing image 41, and is to be the viewpoint listing image in which the size of the thumbnails of the partial omnidirectional images corresponding to the viewpoints D, E, and F is enlarged.

Moreover, FIG. 4 (*a*) indicates a case in which the accepting unit 15 has accepted an instruction to change to the viewpoint C from a user. Specifically, operation of the display control unit 14 when the accepting unit 15 accepts operation indicating the instruction to change to the viewpoint C from a user is the same as the case of accepting the operation indicating the instruction to change to the viewpoint E from a user, and therefore, explanation thereof is omitted.

The display image in FIG. 4 (*a*) includes an omnidirectional image 32 and a viewpoint listing image 42. The omnidirectional image 32 is an omnidirectional image including a partial omnidirectional image of a region including the viewpoint C in the center. The viewpoint listing image 42 displays thumbnails of the partial omnidirectional images corresponding to the viewpoints included in the omnidirectional image 32 in the center of the viewpoint listing image 42, and is to be the viewpoint listing image in which the size of the thumbnails of the partial omnidirectional images corresponding to the viewpoints B to D is enlarged.

Figures 5, 6:
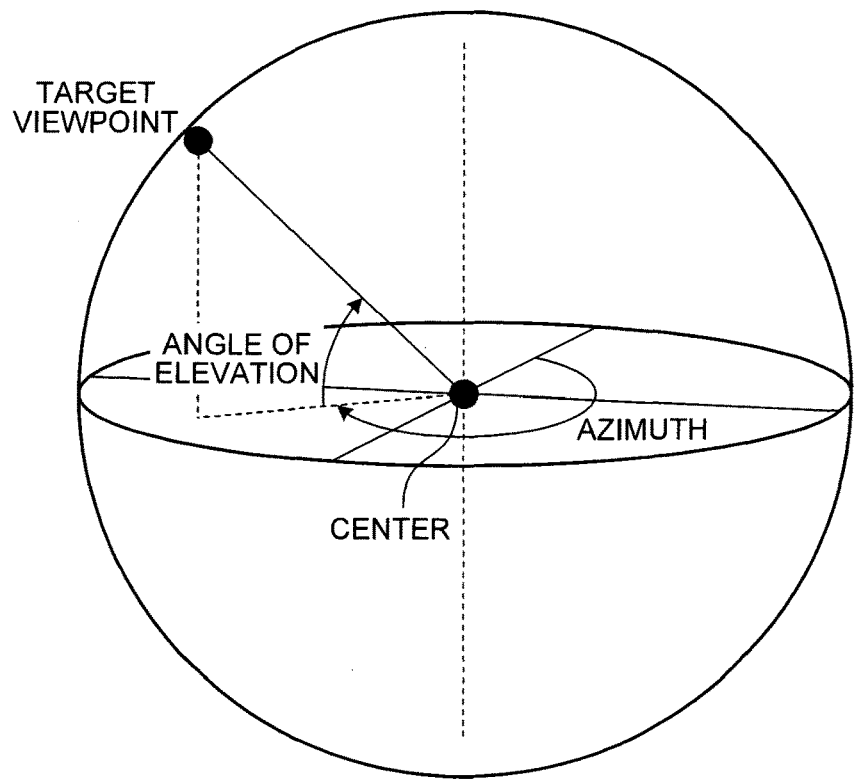
FIG. 5 is a diagram for explaining positions of viewpoints on the omnidirectional image of the first embodiment.
FIG. 6 is a diagram for explaining relation among an angle of view, a camera angle, and a camera position.

Next, before explaining a display control method of the display control apparatus 10 referring to a flowchart, coordinates that indicate a position of an omnidirectional image, and the viewpoint listing information are explained in detail. FIG. 5 is a diagram for explaining positions of viewpoints on the omnidirectional image of the first embodiment. The display control apparatus 10 according to the present embodiment displays on the display device 20 in such a form as if a user that is viewing the display device 20 is actually viewing a predetermined direction from the imaging spot. Therefore, the display control apparatus 10 according to the present embodiment associates a point on the omnidirectional image with a point on a sphere, and thereby uses the omnidirectional image as an image on a sphere. Because the omnidirectional image is a planar image as shown in FIG. 2, the curvature thereof differs from that of a sphere. However, by making the omnidirectional image based on Mercator projection, the display control apparatus 10 can arrange points on the omnidirectional image so as to correspond to points on a sphere.

The coordinates on the omnidirectional image can be expressed by an azimuth (coordinate in a horizontal direction) from the center of a sphere and an angle of elevation (coordinate in a vertical direction) from the center of the sphere. The azimuth takes a value in a range of 0° to 360° in a clockwise direction. The angle of elevation takes a value in a range of −90° to 90°. Accordingly, a position of a viewpoint on the omnidirectional image can be expressed by the azimuth and the angle of elevation. Moreover, the partial omnidirectional image is an image that includes an arbitrary viewpoint on the omnidirectional image in the center. Therefore, the partial omnidirectional image can be expressed by coordinates (the azimuth and the angle of elevation) of a viewpoint in the center of the image, and an angle of view (a zoom value of a camera).

Figures 7, 8:
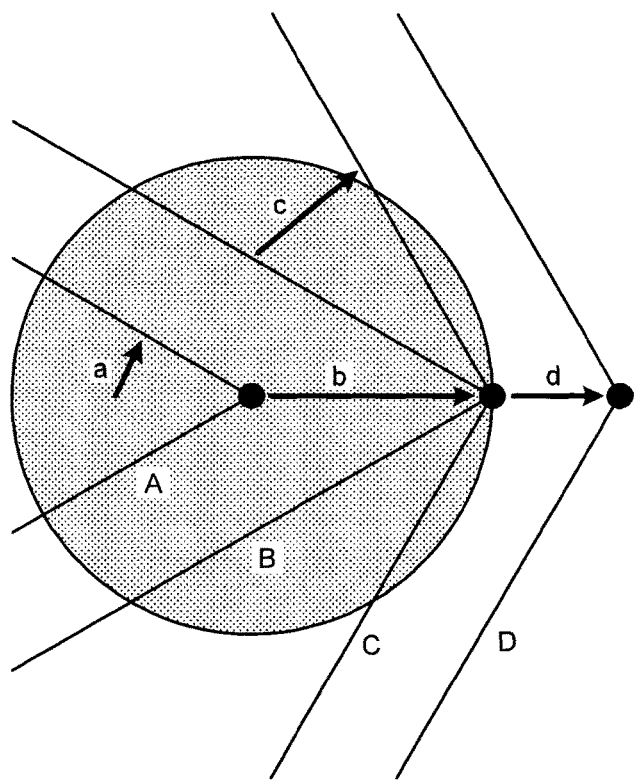
FIG. 7 is a diagram for explaining relation among an angle of view, a camera angle, and a camera position.
FIG. 8 is a table indicating an example of viewpoint listing information of the display control apparatus of the first embodiment.

A method of adjusting the angle of view of an omnidirectional image that is displayed on the display device 20 by adjusting a camera angle and a camera position is explained. FIG. 6 and FIG. 7 are diagrams for explaining relation among an angle of view, a camera angle, and a camera position. FIG. 6 exemplifies a range (a to d) and a specific value (A to D) for the relation among an angle of view, a camera angle, and a camera position. FIG. 7 indicates geometrical positional relation between the range (a to d) and the specific value (A to D). A circumference of FIG. 7 indicates an omnidirectional image. The angle of view indicates a range (size of an image) of a sight when a viewpoint included in the omnidirectional image in the center is viewed from the center of the sphere, by an angle from the center. The omnidirectional image that is indicated by this range of sight corresponds to the omnidirectional image 30, 31, or 32 shown in FIG. 4.

A specific example of adjusting an angle of view with a camera angle and a camera position is explained. An example of A (60° of angle of view) is attainable by setting a camera position to the center (0.0) of a sphere, and setting the camera angle to 60°. An example of B (120° of angle of view) is attainable by setting the camera position to −1.0 shifting the position of the camera backward from the center of the sphere by 1.0, and by setting the camera angle to 60°. An example of C (240° of angle of view) is attainable by setting the camera position to −1.0 shifting the position of the camera backward from the center of the sphere by 1.0, and by setting the camera angle to 120°. An example of D (286° of angle of view) is attainable by setting the camera position to −1.38 shifting the position of the camera backward from the center of the sphere by 1.38, and by setting the camera angle to 120°.

The display control unit 14 can adjust the angle of view of the omnidirectional image displayed on the display device 20 by thus adjusting the camera angle and the camera position. In explanation of the present embodiment, the angle of view of the omnidirectional image is fixed to 120° (example of B). Note that the angle of view of the omnidirectional image is not limited to 120°, and may be arbitrary.

FIG. 8 is a table indicating an example of the viewpoint listing information of the display control apparatus 10 of the first embodiment. The viewpoint listing information includes a viewpoint, an azimuth, an angle of elevation, an angle of view, and a thumbnail. The viewpoint is information for identifying a viewpoint. The azimuth indicates the position of a viewpoint on the omnidirectional image in the horizontal direction. The angle of elevation indicates the position of a viewpoint on the omnidirectional image in the vertical direction. An angle of view indicates a range of the partial omnidirectional image that includes the viewpoint in the center of an image. A thumbnail is a reduced image of the partial omnidirectional image of a viewpoint displayed in the viewpoint listing image. In explanation of the present embodiment, to give easily comprehensible explanation about operation of the processing of changing display of the omnidirectional image and the processing of changing display of the viewpoint listing image in conjunction with each other, in an example shown in FIG. 8, the difference in position among viewpoints A to G occurs only in the azimuth. Therefore, in the explanation of the present embodiment, the angle of view is explained as an angle of view in the horizontal direction (horizontal angle of view).

In addition, the value of the azimuth of the viewpoint listing information, the angle of elevation, and the angle of view may be set arbitrarily. An example in which a difference in the position of a viewpoint occurs not only in the azimuth (coordinate in the horizontal direction) but also in the angle of elevation (coordinate in the vertical direction) is explained in the third embodiment.

Figure 9:
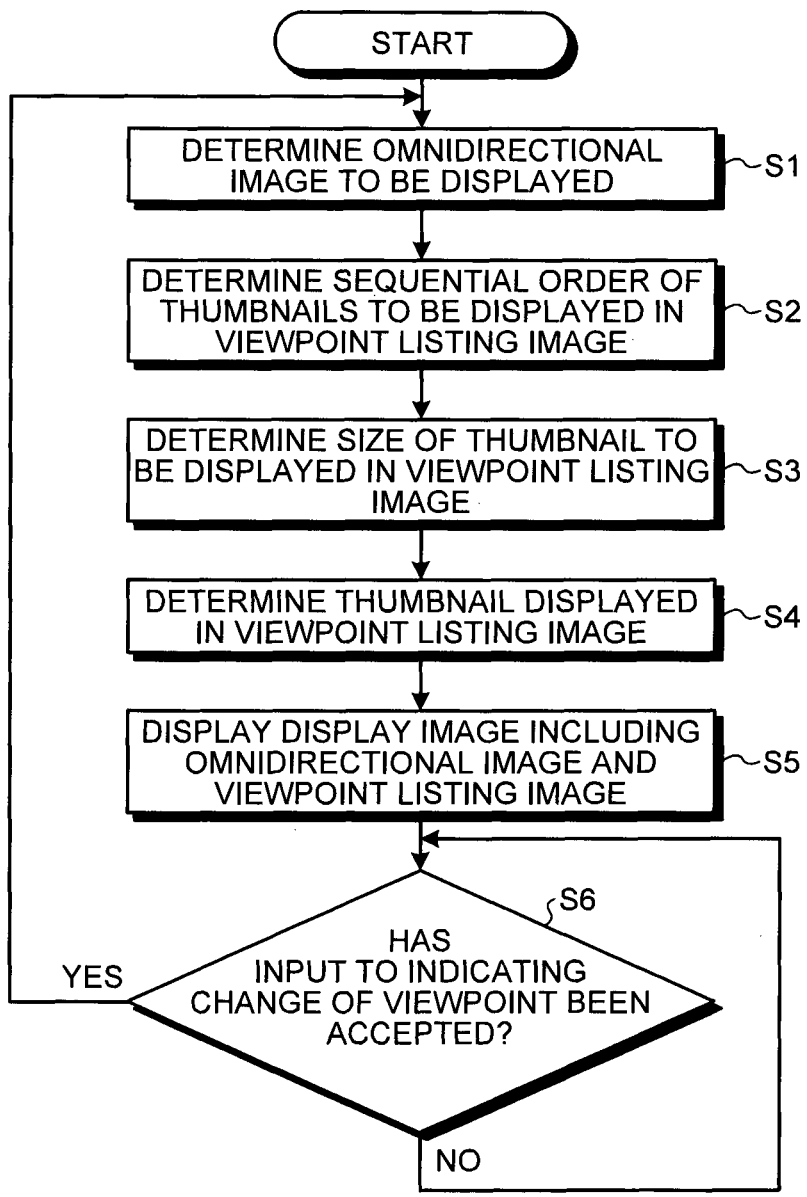
FIG. 9 is a flowchart indicating an example of a display control method of the first embodiment.
Figure 10:
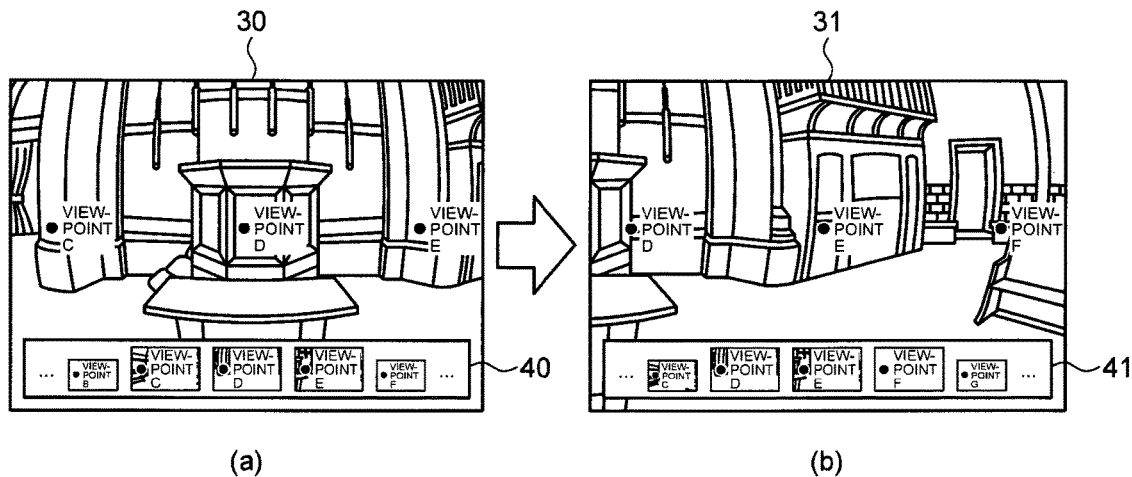
FIG. 10 is a diagram illustrating an example of changing a display image that is displayed on the display device of the first embodiment.

Next, a display control method of the display control apparatus 10 of the first embodiment is explained. FIG. 9 is a flowchart indicating an example of a display control method of the first embodiment. FIG. 10 is a diagram illustrating an example of changing a display image that is displayed on the display device 20 of the first embodiment. With reference to FIG. 8 to FIG. 10, processing performed when the omnidirectional image of the display image is changed from the omnidirectional image 30 having the viewpoint D in the center to the omnidirectional image 31 having the viewpoint E in the center is explained.

The display control unit 14 determines a region of the omnidirectional image to be displayed on the display device 20, that is, a displayed omnidirectional image (step S1). When displaying an omnidirectional image for the first time, the display control unit 14 determines the omnidirectional image to be displayed on the display device 20 to the omnidirectional image 30 including the viewpoint D. This is because the viewpoint D is set to a reference (0°) of the azimuth and an angle of elevation in the omnidirectional image in the viewpoint listing information shown in FIG. 8. Moreover, when the accepting unit 15 accepts the input indicating a change of the viewpoint from a user (step S6 described later: YES), the display control unit 14 determines the omnidirectional image displayed on the display device 20 according to the input indicating a change of the viewpoint. Subsequently, a flow by which the display shown in FIG. 10 (a) is made is explained.

Next, the display control unit 14 determines the sequential order of thumbnails of partial omnidirectional images displayed in the viewpoint listing image (step S2). Hereinafter, a specific explanation is given using the case in which the omnidirectional image displayed on the display device 20 is determined to the omnidirectional image 30 including the viewpoint D at step S1 as an example. First, the display control unit 14 determines the sequential order of thumbnails according to the azimuth (coordinate in the horizontal direction) of the omnidirectional image 30 currently displayed. In the example of the viewpoint listing information shown in FIG. 8, the sequential order of thumbnails is ascending order in the azimuth of viewpoints corresponding to the thumbnails as the viewpoint D (0°), the viewpoint E (50°), the viewpoint F (100°), the viewpoint G (150°), the viewpoint A (200° degrees), the viewpoint B (250°), and the viewpoint C (300°). Note that the azimuth is indicated in the clockwise direction. Next, the display control unit 14 rearranges the sequential order of the thumbnails such that the thumbnail of the partial omnidirectional image corresponding to the viewpoint D comes in the center in the viewpoint listing image. That is, arranging the thumbnail of the partial omnidirectional image corresponding to the viewpoint D in the center, the display control unit 14 distributes the thumbnails to the right and left in a range of 180° from the center. Because the azimuth of the viewpoint D is 0°, the left side thereof is 0° to −180° (180° to 360°), and the right side thereof is 0° to +180°. Therefore, the sequential order of the thumbnails is as the viewpoint A (200° (−160°)), the viewpoint B (250° (−110°)), the viewpoint C (300° (−60°)), the viewpoint D (0°), the viewpoint E (50°), the viewpoint F (100°), and the viewpoint G (150°).

Next, the display control unit 14 determines the size of the thumbnails of the partial omnidirectional image to be displayed in the viewpoint listing image (step S3). Herein, a specific explanation is given using the case in which the omnidirectional image displayed on the display device 20 is determined to the omnidirectional image 30 including the viewpoint D in the center at step S1 as an example. The display control unit 14 enlarges the size of the thumbnails of the partial omnidirectional image corresponding to the viewpoints included in the omnidirectional image 30. Referring to viewpoint listing information in FIG. 8, the azimuth of the viewpoint D is 0° and the angle of view is 120°. Moreover, because the angle of elevation of all the viewpoints A to G is 0°, a viewpoint never falls outside the range because of the difference in the angle of elevation. Therefore, the display control unit 14 enlarges the thumbnails of the partial omnidirectional image corresponding to the viewpoints the azimuth of which is included in the range of the angle of view of the omnidirectional image 30. Because the azimuth of the viewpoint D is 0° and the angle of view of the omnidirectional image 30 including the viewpoint D in the center is 120°, the display control unit 14 determines that a viewpoint having the azimuth of +60° to −60 (300°) is included in the omnidirectional image 30. Subsequently, the display control unit 14 identifies the viewpoint C (azimuth 300°), the viewpoint D (azimuth 0°), and the viewpoint E (azimuth 50°) as a viewpoint having the azimuth of +60° to —60° (300°) from the viewpoint listing information. By the procedure described above, the display control unit 14 determines the thumbnails of the partial omnidirectional image corresponding to the viewpoint C (azimuth 300°), the viewpoint D (azimuth 0°), and the viewpoint E (azimuth 50°) as the thumbnails of which the size is enlarged.

Next, the display control unit 14 determines thumbnails to be displayed in the viewpoint listing image that is displayed on the display device 20 (step S4). Specifically, according to the omnidirectional image determined at step S1 and the size of the viewpoint listing image, the thumbnails of the partial omnidirectional image to be displayed in the viewpoint listing image are determined. That is, a predetermined number of thumbnails of the partial omnidirectional images of viewpoints close in distance to the viewpoints that are included in the omnidirectional image determined at step S1 are selected in ascending order in distance. In this example, the predetermined number is 4.

For the thumbnails of the partial omnidirectional image displayed in the viewpoint listing image, a case in which the sequential order of the thumbnails determined at step S3 is as the viewpoint A (200° (−180°)), the viewpoint B (250° (−110°)), the viewpoint C (300° (−60°)), the viewpoint D (0°), the viewpoint E (50°), the viewpoint F (100°), and the viewpoint G (150°) is explained. In this case, because the viewpoint D(0°) is in the center of the viewpoint listing image, thumbnails corresponding to the viewpoint B (250° (−110°)), the viewpoint C (300° (−60°)), the viewpoint D (0°), the viewpoint E (50°), the viewpoint F (100°) are displayed. That is, display of thumbnails of the partial omnidirectional images corresponding to the viewpoint A (200° (−180°)) and the viewpoint G (150°) is omitted displaying as ". . . . "

The display control unit 14 displays, on the display device 20, a display image that includes the omnidirectional image determined at step S1 and the viewpoint listing image generated at step S2 to step S4 (step S5). By control in such a flow, the display shown in FIG. 10 (*a*) is made.

Next, a flow of changing from the display shown in FIG. 10(*a*) to a display shown in FIG. 10 (*b*) is explained. First, the accepting unit 15 determines whether or not input indicating a change of the omnidirectional image (change of viewpoint) from a user is accepted (step S6), when the input indicating a change of viewpoint has not been accepted (step S6: NO), processing to detect input indicating a change of omnidirectional image according to operation by a user is continued.

When input indicating a change of viewpoint is accepted (step S6: YES), processing returns to step S1. Herein, a case in which the accepting unit 15 has accepted input indicating that a display of the omnidirectional image is changed to the omnidirectional image including the viewpoint E in the center is specifically explained as an example. The display control unit 14 determines the omnidirectional image to be displayed on the display device 20 to the omnidirectional image 31 including the viewpoint E in the center (step S1).

Subsequently, the display control unit 14 determines the sequential order of thumbnails of the partial omnidirectional images to be displayed in the viewpoint listing image (step S2). First, the display control unit 14 determines the sequential order of thumbnails according to the azimuth (coordinate in the horizontal direction). In the example of the viewpoint listing information shown in FIG. 8, the sequential order of thumbnails is ascending order in the azimuth of viewpoints corresponding to respective thumbnails as the viewpoint D (0°), the viewpoint E (50°), the viewpoint F (100°), the viewpoint G (150°), the viewpoint A (200°), the viewpoint B (250°), and the viewpoint C (300°). Note that the azimuth is indicated in the clockwise direction. Next, the display control unit 14 rearranges the sequential order of the thumbnails such that the thumbnail of the partial omnidirectional image 31 corresponding to the viewpoint E comes in the center in the viewpoint listing image. That is, arranging the thumbnail of the partial omnidirectional image 31 corresponding to the viewpoint E in the center, the display control unit 14 distributes the thumbnails to the right and left in a range of 180° from the center. Because the azimuth of the viewpoint E is 50°, the left side thereof is 50° to −130° (230° to 360° and 0° to 50°), and the right side thereof is 50° to +230°. Therefore, the sequential order of the thumbnails is as the viewpoint B (250° (−110°)), the viewpoint C (300° (−60°)), the viewpoint D (0°), the viewpoint E (50°), the viewpoint F (100°), the viewpoint G (150°), and the viewpoint A (200° (−160°)).

Next, the display control unit 14 determines the size of the thumbnails of the partial omnidirectional image to be displayed in the viewpoint listing image (step S3). As shown in FIG. 10 (*b*), the display control unit 14 enlarges the size of the thumbnails of the partial omnidirectional images corresponding to the viewpoints included in the omnidirectional image 31. Referring to the viewpoint listing information in FIG. 8, the azimuth of the viewpoint E is 50° and the angle of view is 120°. Moreover, because the angle of elevation of all the viewpoints A to G is 0°, a viewpoint never falls outside the range because of the difference in the angle of elevation. Therefore, the display control unit 14 enlarges the thumbnails of the partial omnidirectional images corresponding to the viewpoints of which the azimuth is included in the range of the angle of view of the omnidirectional image 31. Because the azimuth of the viewpoint E is 50° and the angle of view of the omnidirectional image 31 including the viewpoint E in the center is 120°, the display control unit 14 determines that a viewpoint having the azimuth of −10) (350°) to +110° is included in the omnidirectional image 31. Subsequently, the display control unit 14 identifies the viewpoint D (azimuth0°), the viewpoint E (azimuth50°), and the viewpoint F (100°) as a viewpoint having the azimuth of −10 (350°) to +110° from the viewpoint listing information. By the procedure described above, the display control unit 14 determines to enlarge the size of the thumbnails of the partial omnidirectional image corresponding to the viewpoint D (azimuth 0°), the viewpoint E (azimuth 50°), and the viewpoint F (100°).

Next, the display control unit 14 determines thumbnails to be displayed in the viewpoint listing image that is displayed on the display device 20 (step S4). Because the viewpoint E (50°) is in the center of the viewpoint listing image, thumbnails of the partial omnidirectional images corresponding to the viewpoint C (300° (−60°)), the viewpoint D (0°), the viewpoint E (50°), the viewpoint F (100°), and the viewpoint G (150°) are displayed. That is, display of thumbnails of the partial omnidirectional image corresponding to the viewpoint B (250° (−110°)) and the viewpoint A (200° (−180°)) is omitted displaying as ". . . . "

Summarizing the processing in the flowchart described above, the display image displayed on the display device 20 is changed as indicated in FIG. 10 (*b*) from one in FIG. 10 (*a*). Although a case in which the angle of elevation is identical is indicated in the first embodiment, referring to FIG. 14 indicated in a modification described later, thumbnails of viewpoints b, d, e, f, and h that are the viewpoints within the range in which the omnidirectional image 60 is displayed may be displayed in an enlarged manner even if a viewpoint having a different angle of elevation is included.

The display control unit 14 in the display control apparatus 10 of the present embodiment displays, according to the input indicating a change of an omnidirectional image (may also be regarded as a change of a region of the omnidirectional image to be displayed), thumbnails of a partial omnidirectional image corresponding to a region of the omnidirectional image to be newly displayed in the center of the viewpoint listing image, and enlarges the size of the thumbnails of the partial omnidirectional images that includes the viewpoints included in the omnidirectional image of the display image in the center. Therefore, the relation between the display range of the image currently displayed on a screen and the information indicating a list of viewpoints on the image can be clarified.

Second Embodiment

Next, the display control apparatus 10 of a second embodiment is explained. The display control unit 14 in the display control apparatus 10 of the present embodiment makes the size of thumbnails of partial omnidirectional images including, in the center, viewpoints that are included in an omnidirectional image of the display image smaller than thumbnails of partial omnidirectional images including viewpoints that are not include in the omnidirectional image of the display image in the center. That is, while the display control apparatus 10 of the first embodiment emphasizes, in the viewpoint listing image, thumbnails of viewpoints that are displayed on the display device 20, the display control apparatus 10 of the second embodiment emphasizes, in the viewpoint listing image, thumbnails of viewpoints that are not displayed on the display device 20.

Because the configuration of the display control apparatus 10 of the present embodiment is the same as that of the display control apparatus 10 of the first embodiment, explanation thereof is omitted. Moreover, because explanation of the present embodiment is similar to the explanation of the first embodiment, differences from the first embodiment are specifically explained based on a specific example.

Figure 11:
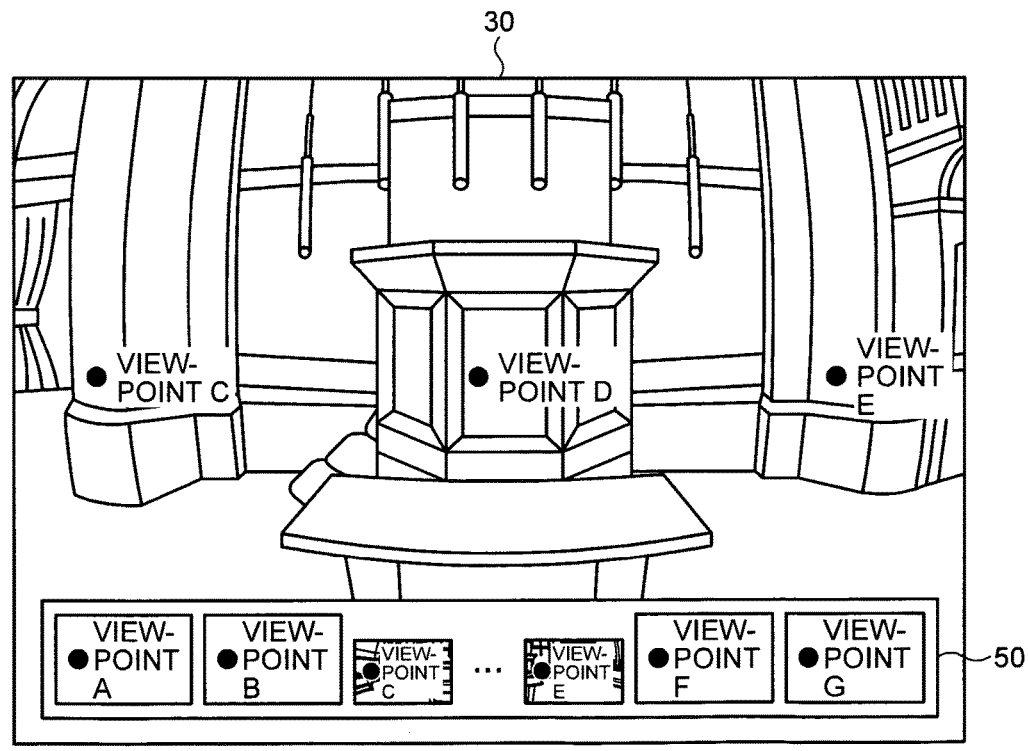
FIG. 11 is a diagram illustrating an example of a display image that is displayed on a display device of a second embodiment according to the present invention.

FIG. 11 is a diagram illustrating an example of the display image that is displayed on the display device 20 of the second embodiment. FIG. 11 is a corresponding diagram to FIG. 3 that is referred to in the explanation of the first embodiment. However, a viewpoint listing image 50 is different from the viewpoint listing image 40 of the first embodiment. That is, the display control unit 14 enlarges thumbnails of the partial omnidirectional images corresponding to the viewpoints A, B, F, and G that are not included in the omnidirectional image 30. Furthermore, the display control unit 14 does not enlarge thumbnails of the partial omnidirectional images corresponding to the viewpoints C, D, and E included in the omnidirectional image 30. Although the thumbnail of the partial omnidirectional image of the viewpoint D is omitted, the thumbnail of the partial omnidirectional image of the viewpoint D may be displayed not omitting.

FIG. 12 (a) to (c) are diagrams illustrating an example of changing the display image that is displayed on the display device 20 of the second embodiment. FIG. 12 is a corresponding diagram to FIG. 4 that is referred to in the explanation of the first embodiment. An image indicated in FIG. 12 (b) is a case in which the viewpoint D is included in the omnidirectional image in the center, and indicates the display image before the change. When the accepting unit 15 accepts input to change to the viewpoint E from a user, the display control unit 14 displays the display image including the omnidirectional image 31 and the viewpoint listing image 51 shown in FIG. 12 (c). First, the omnidirectional image 31 and the viewpoint listing image 51 are explained. The omnidirectional image 31 is an omnidirectional image for which the region is set such that a display including the viewpoint E is obtained. The viewpoint listing image 51 is a viewpoint listing image in which ". . ." is displayed in the center of the viewpoint listing image 51 omitting the thumbnails of the partial omnidirectional images corresponding to the viewpoints included in the omnidirectional image 31, such as the viewpoint E, and in which the size of the thumbnails of the partial omnidirectional images corresponding to the viewpoints B, C, G, and A that are not included in the omnidirectional image 31 is enlarged.

Moreover, when the accepting unit 15 accepts input to change to the viewpoint C from a user, that is, when a screen indicated in FIG. 12 (a) is displayed, the display control unit 14 displays the display image including an omnidirectional image 32 and a viewpoint listing image 52. The omnidirectional image 32 is an omnidirectional image for which the region is set such that a display including the viewpoint C is obtained. The viewpoint listing image 52 is a viewpoint listing image in which ". . ." is displayed in the center of the viewpoint listing image 52 omitting the thumbnails of the partial omnidirectional images corresponding to the viewpoints included in the omnidirectional image 32, such as the viewpoint C, and in which the size of the thumbnails of the partial omnidirectional images corresponding to the viewpoints G, A, E, and F that are not included in the omnidirectional image 32 is enlarged. Although a case in which the angle of elevation is identical as described is indicated in the second embodiment, referring to FIG. 14 indicated in the modification described later, thumbnails of the viewpoints a, c, g, and i that are viewpoints outside the range in which the omnidirectional image 60 is displayed may be displayed in an enlarged manner even if a viewpoint having a different angle of elevation is included.

The display control unit 14 in the display control apparatus 10 of the present embodiment enlarges the size of thumbnails of partial omnidirectional images including a viewpoint that is not included in the omnidirectional image of the display image in the center, thereby differentiating the sizes of the thumbnails in the viewpoint listing image. Thus, relation between a display range that is displayed on a screen and information indicating a list of viewpoints on the image can by clarified. Moreover, by displaying thumbnails of viewpoints that are not displayed instead of viewpoints that are already displayed in the omnidirectional image, it is possible to emphasize the presence of other viewpoints.

Third Embodiment

Next, the display control apparatus 10 of a third embodiment is explained. The display control unit 14 in the display control apparatus 10 of the present embodiment differs from the display control apparatus 10 of the first embodiment in that the display control unit 14 controls display when multiple viewpoints not only the azimuth of which but also the angle of elevation of which vary are present. Because the configuration of the display control apparatus 10 of the present embodiment is the same as that of the display control apparatus 10 of the first embodiment, explanation thereof is omitted. Moreover, because explanation of the present embodiment is similar to the explanation of the first embodiment, differences from the first embodiment are specifically explained based on a specific example.

FIG. 13 is a table indicating an example of viewpoint listing information of the display control apparatus 10 of the third embodiment. The viewpoint listing information includes, a viewpoint, an azimuth, an angle of elevation, a horizontal angle of view, a vertical angle of view, and a thumbnail. The viewpoint is information to identify a viewpoint. The azimuth indicates a position in the horizontal direction of a viewpoint on an omnidirectional image. The horizontal angle of view indicates a range in the horizontal direction of the omnidirectional image including the viewpoint in the center of the image. The vertical angle of view indicate a range in the vertical direction of the omnidirectional image including the viewpoint in the center of the image. The thumbnail is a reduced image of the partial omnidirectional image including the viewpoint in the center thereof displayed in the viewpoint listing image. Coordinates of viewpoints a to i on the omnidirectional image included in the viewpoint listing information shown in FIG. 13 can be expressed by putting the azimuth on a coordinate in the horizontal direction and the angle of elevation on a coordinate in the vertical direction.

Figure 14:
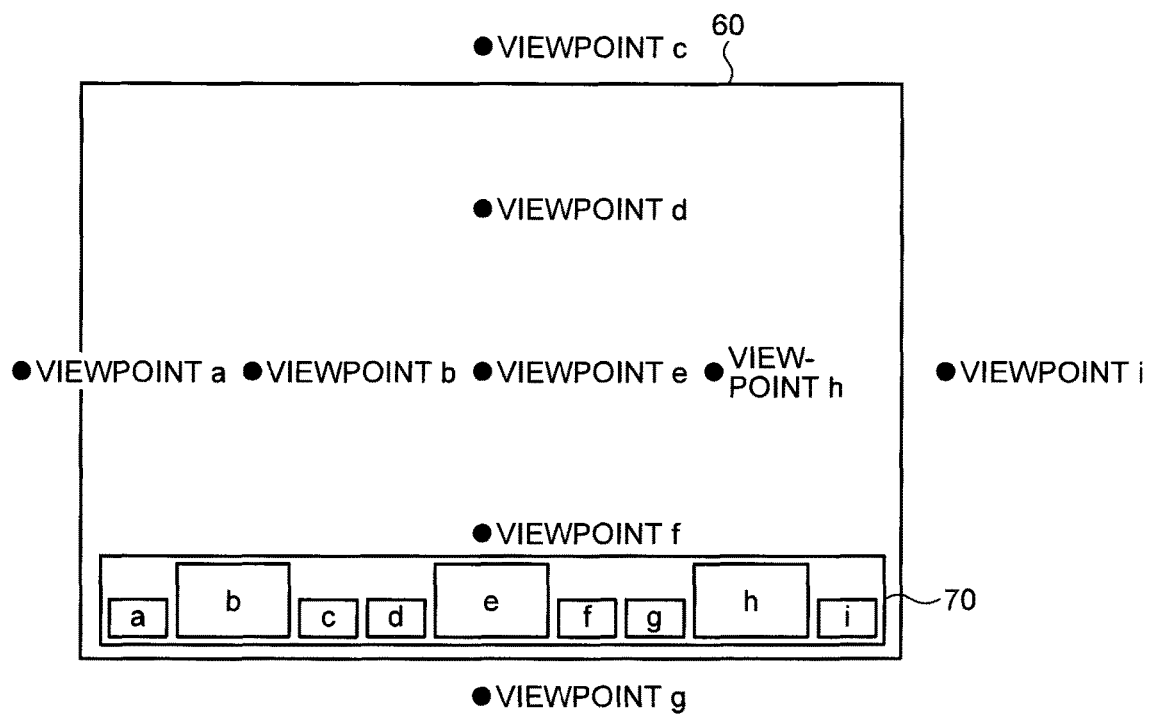
FIG. 14 is a diagram illustrating an example of a display image that is displayed on a display device of the third embodiment.

FIG. 14 is a diagram illustrating an example of the display image that is displayed on the display device 20 of the third embodiment. The display image includes an omnidirectional image 60 and a viewpoint listing image 70. The omnidirectional image 60 shown in FIG. 14 is an example of a case in which a viewpoint e on the omnidirectional image is included in the center of the image. That is, it is an example in which the display device 20 displays the omnidirectional image 60 corresponding to display having the viewpoint e in the center. The omnidirectional image 60 includes the viewpoint b on a left side of the image, the viewpoint h on a right side of the image, the viewpoint d on a central upper side of the image, and the viewpoint f on a central lower side of the image, besides the viewpoint e. It is indicated that the viewpoint a, the viewpoint c, the viewpoint g, and the viewpoint i are outside the display range of the omnidirectional image 60. As described, even if being outside the range, the omnidirectional image is present, and this omnidirectional image 60 signifies the omnidirectional image that is displayed in the display range.

The viewpoint listing image 70 shown in FIG. 14 is an example when displayed at a lower part of a screen of the display device 20. In the viewpoint listing image 70, the thumbnails of the partial omnidirectional images corresponding to the viewpoints a to i are displayed. The display control unit 14 controls such that the thumbnail of the partial omnidirectional image corresponding the viewpoint e is displayed at a predetermined position in the viewpoint listing image 70. In the display control apparatus 10 according to the present embodiment, the predetermined position is a position at the center of the viewpoint listing image.

Next, the size of thumbnails in the viewpoint listing image 70 is explained. The display control unit 14 of the present embodiment determines thumbnails the size of which is to be enlarged in the viewpoint listing image 70 as follows. First, the display control unit 14 identifies the viewpoint b, the viewpoint d, the viewpoint e, the viewpoint f, and the viewpoint h as the viewpoints included in the omnidirectional image 60, based on the horizontal angle of view and the vertical angle of view of the omnidirectional image 60, and coordinates (an azimuth and an angle of elevation) of each viewpoint. The display control unit 14 determines whether a viewpoint is included in the image based on the horizontal angle of view of the omnidirectional image 60 as for a coordinate of the viewpoint in the horizontal direction (azimuth). The display control unit 14 determines whether a viewpoint is included in the image based on the vertical angle of view of the omnidirectional image 60 as for a coordinate of the viewpoint in the vertical direction (angle of elevation). Because explanation of the method of determining whether or not a viewpoint is included in an omnidirectional image of the display image is the same as the explanation of the first embodiment, detailed explanation thereof is omitted.

The display control unit 14 determines to enlarge the thumbnail of the viewpoint e included in the omnidirectional image 60 in the center thereof. Next, the display control unit 14 determine, for viewpoints that are included in the omnidirectional image 60 at positions other than the center, whether to enlarge a thumbnail of a partial omnidirectional image including the viewpoint in the center. The display control unit 14 refers to the angle of elevation of each of the viewpoints in the viewpoint listing information in FIG. 13, and identifies a viewpoint that has the same angle of elevation(0°) as that of the viewpoint e included in the omnidirectional image 60 in the center, or an angle of elevation within a predetermined range (for example, ±10°). Such viewpoints are the viewpoint b and the viewpoint h. The display control unit 14 determines to enlarge the size of the thumbnail of the partial omnidirectional image that includes the viewpoint b in the center and the thumbnail of the partial omnidirectional image that includes the viewpoint h in the center. In summary, the display control unit 14 enlarges the size of the partial omnidirectional images corresponding to the viewpoint b, the viewpoint e, and the viewpoint h.

In other words, among viewpoints that are included in the display range of the omnidirectional image 60, the display control unit 14 does not enlarge the size of thumbnails of the partial omnidirectional images that include viewpoints (the viewpoint d and the viewpoint f) that differ in coordinate in the vertical direction from the coordinate of the viewpoint e included in the omnidirectional image 60 of the display image in the center. Moreover, similarly to the case of the first embodiment, the display control unit 14 does not enlarge a thumbnail of a partial omnidirectional image that includes a viewpoint that is not included in the display range of the omnidirectional image 60.

The display control unit 14 in the display control apparatus 10 of the present embodiment does not enlarge the size of a thumbnail of a partial omnidirectional image including a viewpoint that differs in coordinate in the vertical direction from the coordinate of a viewpoint that is included in the omnidirectional image of the display image in the center, among viewpoints included in the omnidirectional image of the display image. According to the display control apparatus 10 of the present embodiment, even when a difference of a viewpoint occurs in the horizontal direction and the vertical direction, relation between a display range of an image that is currently displayed on a screen and information indicating a list of viewpoints on the image can be clarified.

As a modification of the present embodiment, when a coordinate in the horizontal direction differs, while the size of a thumbnail of a partial omnidirectional image of a viewpoint that differs is not enlarged, the size of a thumbnail of a partial omnidirectional image of a viewpoint a coordinate in the vertical direction of which is identical or within a predetermined range may be enlarged. In such a case, as for the thumbnails in the viewpoint listing image 70 shown in FIG. 14, the thumbnails of the viewpoints e, d, and f are enlarged, and the thumbnails of the viewpoints b and h are not enlarged.

Figure 15:
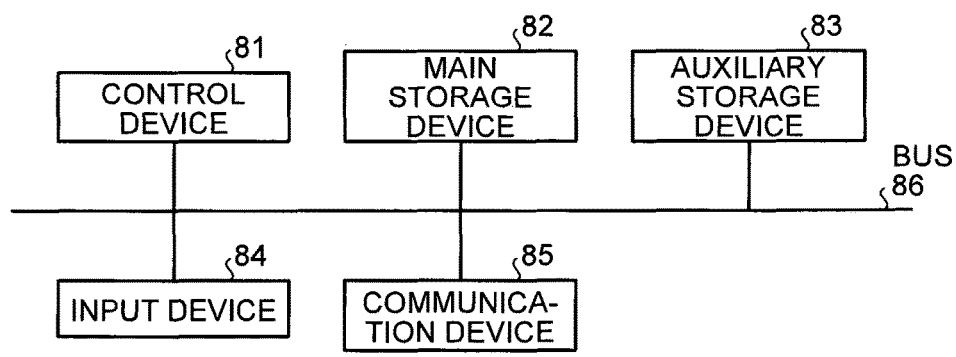
FIG. 15 is a block diagram illustrating an example of a hardware configuration of an essential part of the display control apparatus of the first to the third embodiments.

Finally, a hardware configuration of an essential part of the display control apparatus 10 according to the first to the third embodiment are explained. FIG. 15 is a block diagram illustrating an example of the hardware configuration of the essential part of the display control apparatus 10 of the first to the third embodiments. The display control apparatus 10 of the first to the third embodiments includes a control device 81, a main storage device 82, an auxiliary storage device 83, an input device 84, and a communication device 85. The control device 81, the main storage device 82, the auxiliary storage device 83, the input device 84, and the communication device 85 are connected to each other through a bus 86.

The control device 81 executes a program that is read from the auxiliary storage device 83 to the main storage device 82. The main storage device 82 is a memory such as a ROM (read only memory) and a RAM (random access memory). The auxiliary storage device 83 is, for example, a hard disk, or the like. The input device 84 is an interface to input information to the display control apparatus 10. The communication device 85 is an interface to connect to a network.

A program that is executed in the display control apparatus 10 of the first to the third embodiments may be recorded in a computer-readable recording medium such as a CD-ROM, a memory card, a CD-R, and a DVD (digital versatile disk) in a file in an installable format or an executable format, to be provided as a computer program product. Alternatively, the program that is executed in the display control apparatus 10 of the first to the third embodiments may be stored in a computer that is connected to a network such as the Internet, to be provided through the network by downloading. Alternatively, the program that is executed in the display control apparatus 10 of the first to the third embodiments may be provided or distributed through a network such as the Internet without downloading. Alternatively, the program of the display control apparatus 10 of the first to the third embodiments may be provided by installing in advance in a ROM or the like.

The program that is executed in the display control apparatus 10 of the first to the third embodiments has a module configuration that includes functional blocks (the acquiring unit 11, the creating unit 13, the display control unit 14, and the accepting unit 15) that can be implemented as a program from among respective functional blocks of the display control apparatus 10 described above.

As for the modules, as actual hardware, the program is read from the storage medium described above by the control device 81 to be executed, thereby loading the above respective modules on the main storage device 82. That is, the above respective modules are generated on the main storage device 82. Note that a part or all of the respective functional blocks of the display control apparatus 10 may be implemented not by a program, and may be implemented by hardware such as an IC (integrated circuit).

EXPLANATION OF LETTERS OR NUMERALS

10 Display control apparatus
11 Acquiring unit
12 Storage unit
13 Creating unit
14 Display control unit
15 Accepting unit
20 Display device
81 Control device
82 Main storage device
83 Auxiliary storage device
84 Input device
85 Communication device
86 Bus

The invention claimed is:

1. A non-transitory computer-readable recording medium that contains a computer program, which, when executed by a computer, causes the computer to perform a method comprising:
    creating, from an omnidirectional image, a first partial omnidirectional image that is an image of a part of the omnidirectional image, and that includes a viewpoint on the omnidirectional image, by adjusting a camera angle and a camera position from a sphere, the sphere being defined such that a point thereon is associated with a point on the omnidirectional image;
    displaying, on a display device, a display image that includes the first partial omnidirectional image and a viewpoint listing image that is a list of thumbnails of a first plurality of viewpoints of the omnidirectional image;
    accepting an input, indicating a change in the display image, according to an operation made to any one of the display image and the viewpoint listing image; and
    in response to accepting the input,
        changing the display image according to the input to display a second partial omnidirectional image by changing the camera angle such that the display image includes at least one viewpoint that was not included in the first partial omnidirectional image, and
        changing the viewpoint listing image to a list of thumbnails of a second plurality of viewpoints different from the first plurality of viewpoints such that a size of the thumbnails of the first plurality of viewpoints is different from a size of the thumbnails of the second plurality of viewpoints, and a thumbnail corresponding to the at least one viewpoint that was not included in the first partial omnidirectional image is displayed at a predetermined position in the viewpoint listing image.

2. The non-transitory computer-readable recording medium according to claim 1, wherein
    the predetermined position is a position of a center of the viewpoint listing image.

3. The non-transitory computer-readable recording medium according to claim 1, wherein
    the display image includes at least one viewpoint, and
    a size of a thumbnail of a viewpoint that is included in the display image is larger than a size of a thumbnail of a viewpoint that is not included in the display image.

4. The non-transitory computer-readable recording medium according to claim 1, wherein
    a size of a thumbnail of a viewpoint that is included in the display image is smaller than a size of a thumbnail of a viewpoint that is not included in the display image.

5. The non-transitory computer-readable recording medium according to claim 1, wherein
    each viewpoint is expressed by a coordinate in a horizontal direction and a coordinate in a vertical direction, and
    an order of the thumbnails in the viewpoint listing image is based on coordinates of the thumbnails in the horizontal direction.

6. The non-transitory computer-readable recording medium according to claim 1, wherein
    the operation made to the display image is an operation to designate a viewpoint on the display image.

7. The non-transitory computer-readable recording medium according to claim 1, wherein
    the operation made to the viewpoint listing image is any one of an operation to choose a thumbnail of the viewpoint listing image, and an operation to change a thumbnail that is displayed at the predetermined position in the viewpoint listing image by scrolling on the viewpoint listing image.

8. The non-transitory computer-readable recording medium according to claim 1, wherein the viewpoint listing image includes viewpoints included in the display image.

9. A non-transitory computer-readable recording medium that contains a computer program, which, when executed by a computer, causes the computer to perform a method comprising:
    creating, from an omnidirectional image, a first partial omnidirectional image that is an image of a part of the omnidirectional image, and that includes a viewpoint on the omnidirectional image, by adjusting a camera angle and a camera position from a sphere, the sphere being defined such that a point thereon is associated with a point on the omnidirectional image;
    displaying, on a display device, a display image that includes the first partial omnidirectional image, and a viewpoint listing image that is a list of thumbnails of a first plurality of viewpoints of the omnidirectional image;
    accepting an input, indicating a change in the display image, according to an operation made to any one of the display image and the viewpoint listing image; and
    in response to accepting the input,
        changing the display image according to the input to display a second partial omnidirectional image by changing the camera angle such that the display image includes at least one viewpoint that was not included in the first partial omnidirectional image, and changing the viewpoint listing image to a list of thumbnails of a second plurality of viewpoints different from the first plurality of viewpoints and changing a size of the thumbnails of the first plurality of viewpoints so as to be different from a size of the thumbnails of the second plurality of viewpoints.

10. The non-transitory computer-readable recording medium according to claim 9, wherein the viewpoint listing image includes viewpoints included in the display image.

11. A display control apparatus comprising:
circuitry configured to
create, from an omnidirectional image, a first partial omnidirectional image that is an image of a part of the omnidirectional image, and that includes a viewpoint on the omnidirectional image, by adjusting a camera angle and a camera position from a sphere, the sphere being defined such that a point thereon is associated with a point on the omnidirectional image;
display, on a display device, a display image that includes the first partial omnidirectional image and a viewpoint listing image that is a list of thumbnails of a first plurality of viewpoints of the omnidirectional image;
accept an input, indicating a change in the display image, according to an operation made to any one of the display image and the viewpoint listing image; and
in response to accepting the input,
change the display image according to the input to display a second partial omnidirectional image by changing the camera angle such that the display image includes at least one viewpoint that was not included in the first partial omnidirectional image, and
change the viewpoint listing image to a list of thumbnails of a second plurality of viewpoints different from the first plurality of viewpoints such that a size of the thumbnails of the first plurality of viewpoints is different from a size of the thumbnails of the second plurality of viewpoints, and a thumbnail corresponding to the at least one viewpoint that was not included in the first partial omnidirectional image is displayed at a predetermined position in the viewpoint listing image.

12. The display control apparatus according to claim 11, wherein
the predetermined position is a position of a center of the viewpoint listing image.

13. The display control apparatus according to claim 11, wherein
the display image includes at least one viewpoint, and
a size of a thumbnail of a viewpoint that is included in the display image is larger than a size of a thumbnail of a viewpoint that is not included in the display image.

14. The display control apparatus according to claim 11, wherein
a size of a thumbnail of a viewpoint that is included in the display image is smaller than a size of a thumbnail of a viewpoint that is not included in the display image.

15. The display control apparatus according to claim 11, wherein
each viewpoint is expressed by a coordinate in a horizontal direction and a coordinate in a vertical direction, and
an order of the thumbnails in the viewpoint listing image is based on coordinates of the thumbnails in the horizontal direction.

16. The display control apparatus according to claim 11, wherein
the operation made to the display image is an operation to designate a viewpoint on the display image.

17. The display control apparatus according to claim 11, wherein
the operation made to the viewpoint listing image is any one of an operation to choose a thumbnail of the viewpoint listing image, and an operation to change a thumbnail that is displayed at the predetermined position in the viewpoint listing image by scrolling on the viewpoint listing image.

18. The display control apparatus according to claim 11, wherein the viewpoint listing image includes viewpoints included in the display image.

* * * * *